(12) United States Patent
Oh et al.

(10) Patent No.: US 7,507,593 B2
(45) Date of Patent: Mar. 24, 2009

(54) LIQUID CRYSTAL DISPLAY DEVICE AND METHOD FOR FABRICATING THE SAME

(75) Inventors: Jae Young Oh, Uiwang-si (KR); Soopool Kim, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 138 days.

(21) Appl. No.: 11/473,141

(22) Filed: Jun. 23, 2006

(65) Prior Publication Data

US 2007/0117238 A1    May 24, 2007

(30) Foreign Application Priority Data

Nov. 18, 2005    (KR) .................. 10-2005-0110845

(51) Int. Cl.
*H01L 21/00* (2006.01)
(52) U.S. Cl. .................. 438/30; 438/22; 257/E21.114; 257/E21.464
(58) Field of Classification Search .................. 438/30, 438/22; 257/E21.114, E21.464; 439/1
See application file for complete search history.

(56) References Cited

U.S. PATENT DOCUMENTS 6,699,738 B2 *  3/2004  Hwang et al. ............... 438/149

2001/0032981 A1 * 10/2001 Kong et al. .................... 257/72
2002/0015918 A1 *  2/2002 Bae ............................. 430/314
2003/0160235 A1    8/2003 Hirai

* cited by examiner

*Primary Examiner*—Walter L Lindsay, Jr.
*Assistant Examiner*—Abdulfattah Mustapha
(74) *Attorney, Agent, or Firm*—McKenna Long & Aldridge LLP (57) ABSTRACT

A method for fabricating a liquid crystal display (LCD) device includes: forming a gate line, a gate electrode, and a gate pad electrode on a substrate; sequentially forming a gate insulating layer, a semiconductor layer and a metal layer on an entire surface of the substrate including the gate electrode; forming a first photoresist on the metal layer;

patterning the semiconductor layer, a data line, source and drain electrodes, and a data pad electrode by selectively etching the gate insulating layer, the semiconductor layer, and the metal layer using the first photoresist as a mask; forming a second photoresist to cover the gate pad electrode; forming a passivation layer on an entire surface of the substrate including the first and second photoresists; removing the passivation layer on the first and second photoresists by lift-stripping the first and second photoresists; and forming a pixel electrode electrically connected to the drain electrode.

17 Claims, 12 Drawing Sheets

FIG. 7H

US 7,507,593 B2

LIQUID CRYSTAL DISPLAY DEVICE AND METHOD FOR FABRICATING THE SAME

This application claims the benefit of the Korean Patent Application No. P2005-110845, filed on Nov. 18, 2005, which is hereby incorporated by reference as if fully set forth herein.

BACKGROUND OF THE INVENTION

1. Field of the Invention

The present invention relates to a display device, and more particularly, to a liquid crystal display (LCD) device and method for fabricating the same that can reduce the fabrication time and costs by using a lift-strip process.

2. Discussion of the Related Art

Recently, liquid crystal display (LCD) devices are widely used for flat panel displays because of their high contrast ratio, great gray scale and image display, and low power consumption.

An LCD device includes various patterns on a substrate such as gate and data lines that are formed by a photolithography process. For example, a photoresist, which is sensitive to ultraviolet rays, is coated on a substrate and a photoresist pattern is formed by exposure and development processes using an optical mask. Then, various layers are etched using the photoresist pattern as a mask, and the photoresist pattern is stripped. Accordingly, research has actively been conducted to reduce the number of photolithography processes and improve productivity.

An LCD device generally includes a TFT array substrate, a color filter substrate, a liquid crystal layer and a driving circuit. The TFT array substrate includes a gate line layer, a gate insulating layer, a semiconductor layer, a data line layer, a passivation layer and a pixel electrode. In general, five to seven masks are required to form the TFT array substrate. As the number of masks increases, the number of photolithography steps and the probability of process errors also increase.

FIGS. 1A to 1E are cross-sectional views illustrating a method for fabricating a TFT array substrate of an LCD device according to the related art.

Figure 1A:
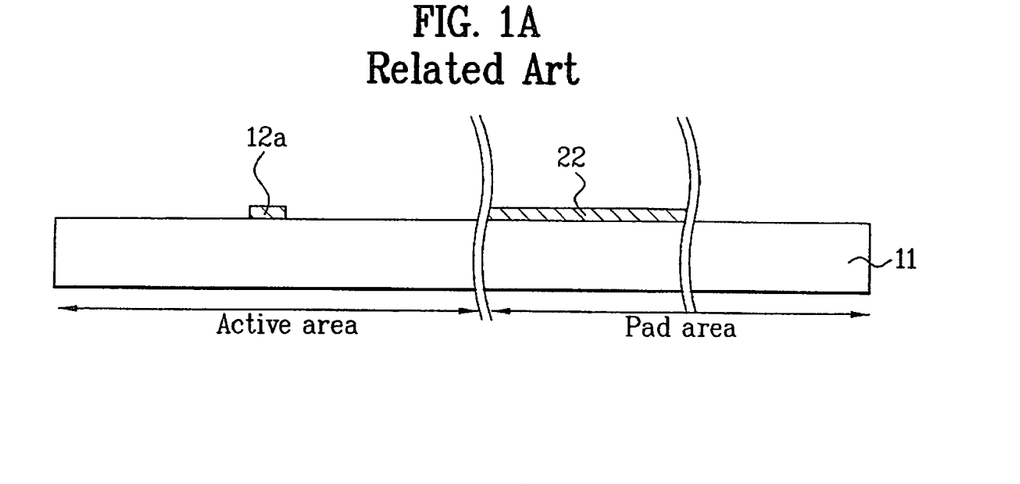
FIGS. 1A to 1E are cross-sectional views illustrating a method for fabricating a TFT array substrate according to the related art.

Referring to FIG. 1A, a low-resistance metal material, for example, copper (Cu), cupper alloy (Cu Alloy), aluminum (Al), aluminum Neodymium (AlNd), molybdenum (Mo), or chrome (Cr), is deposited on a substrate 11, and then a photolithography process using a first mask is applied to the substrate 11 to form a plurality of gate lines (not shown), a gate electrode 12a and a gate pad electrode 22.

The aforementioned photolithography process is performed in the following steps. First, a low-resistance metal material is deposited on a glass substrate, and then a photoresist is coated on the deposited metal material. After a first mask having a pattern layer is aligned with the photoresist, light is exposed to the photoresist and a developer is applied to the photoresist exposed to the light to form a photoresist pattern. Next, the metal material exposed by the photoresist pattern is selectively etched to form a desired pattern of the deposited metal material on the glass substrate.

Figure 1B:
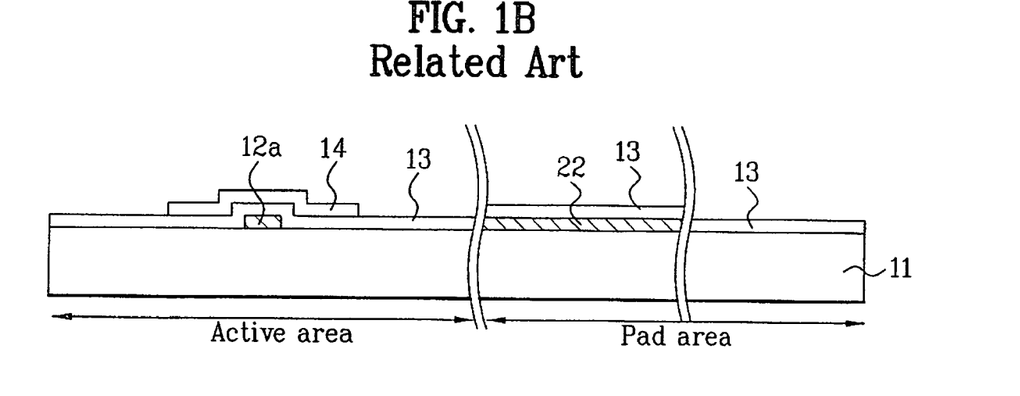

Referring to FIG. 1B, an inorganic insulating material including silicon nitride $SiN_x$ or silicon oxide $SiO_x$ is deposited on an entire surface of the substrate including the gate electrode 12a at a high temperature to form a gate insulating layer 13. Then, an amorphous silicon layer is deposited on the gate insulating layer 13 and is then patterned by a photolithography process using a second mask to form an island-shaped semiconductor layer 14 on the gate insulating layer 13. The semiconductor layer 14 overlaps the gate electrode 12a.

Figure 1C:
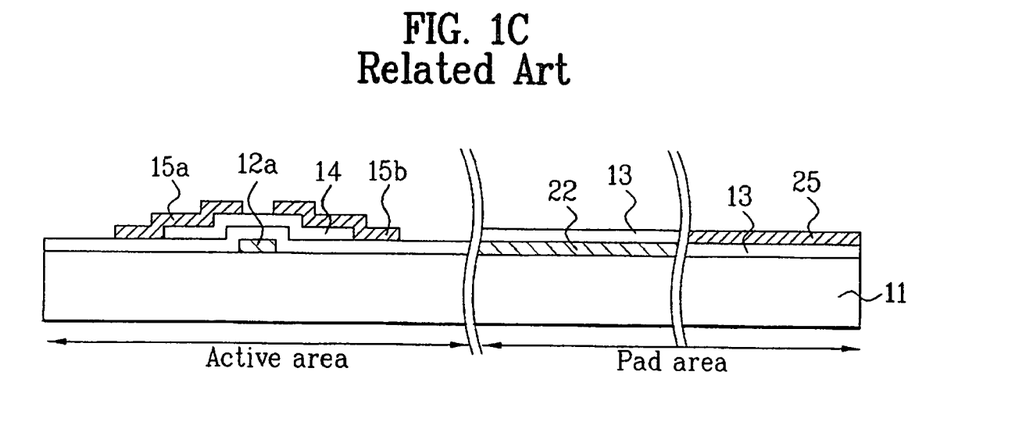

Referring to FIG. 1C, a low-resistance metal material including copper (Cu), aluminum (Al), aluminum Neodymium (AlNd), molybdenum (Mo), or chrome (Cr) is deposited on an entire surface of the substrate including the semiconductor layer 14 and is then patterned by a photolithography process using a third mask to thereby form a data line layer. The data line layer includes a data line (not shown) formed substantially perpendicular to the gate line to define a unit pixel region, source and drain electrodes 15a and 15b overlapping both sides of the semiconductor layer 14 and a data pad electrode 25 at a pad area.

As disclosed above, the deposited gate electrode 12a, the gate insulating layer 13, the semiconductor layer 14 and the source and drain electrodes 15a and 15b form a thin film transistor (TFT) for controlling the on/off states of the unit pixel region.

Figure 1D:
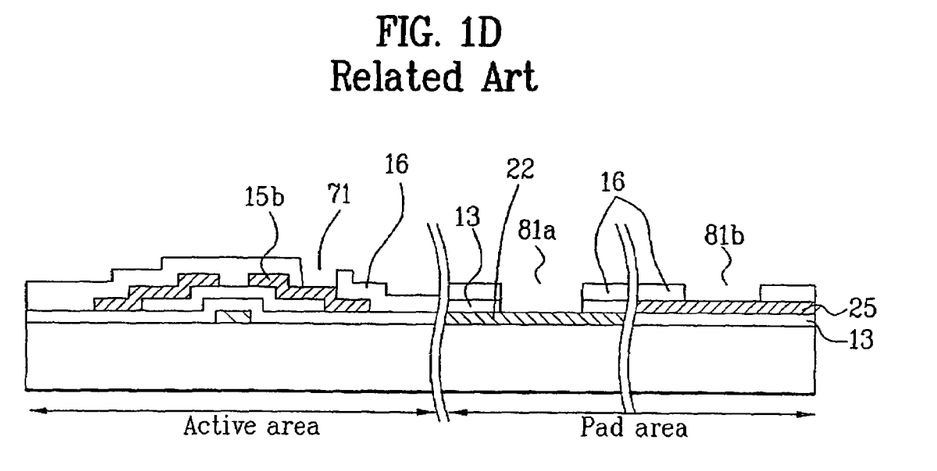

Referring to FIG. 1D, an organic insulating material including BCB or an inorganic insulating material including SiNx is formed on an entire surface of the substrate including the drain electrode 15b to thereby form a passivation layer 16. The passivation layer 16 is selectively removed to form a contact hole 71 exposing the drain electrode 15b, a first pad open region 81a exposing the gate pad electrode 22 and a second pad open region 81b exposing the data pad electrode 25 by a photolithography process using a fourth mask.

Figure 1E:
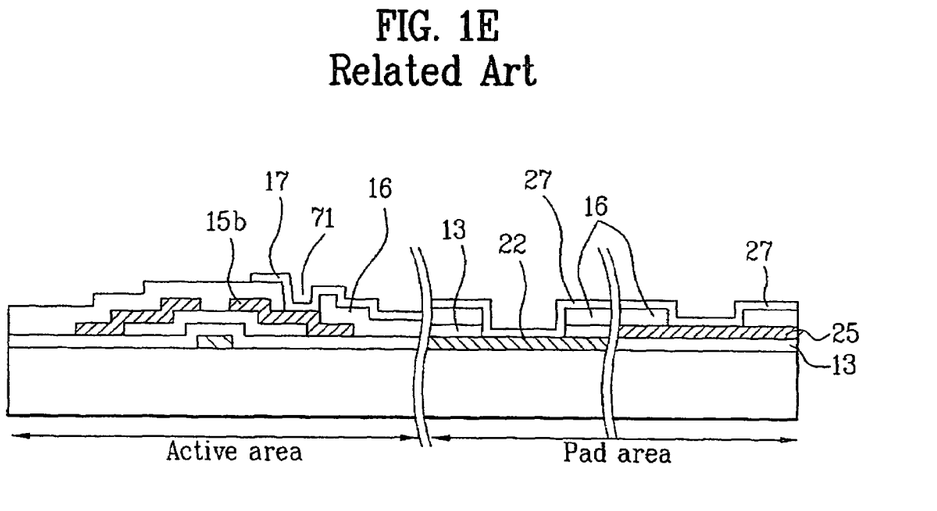

Referring to FIG. 1E, a transparent conductive material including ITO (Indium Tin Oxide) or IZO (Indium Zinc Oxide) is deposited on an entire surface of the substrate including the passivation layer 16, and then a pixel electrode 17 electrically connected to the drain electrode 15b and a transparent conductive layer 27 covering the first and second pad open regions are formed in the active area and the pad area, respectively, by a photolithography process using a fifth mask, thereby completing the fabrication of the TFT array substrate. The transparent conductive layer 27 covering the first and second pad open regions prevents the gate and data pad electrodes from being oxidized.

The method for fabricating an LCD device according to the related art is, however, disadvantageous in that it requires five photolithography processes to form the gate line layer, the semiconductor layer, the data line layer, the contact hole of the passivation layer and the pixel electrode. As the number of photolithography processes increases, the fabrication process becomes complicated and the fabrication time and costs increase.

SUMMARY OF THE INVENTION

Accordingly, the present invention is directed to an LCD device and method for fabricating the same that substantially obviates one or more problems due to limitations and disadvantages of the related art.

An advantage of the present invention is to provide an LCD device and method for fabricating the same that can reduce the fabrication time and costs by using a lift-strip process.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display (LCD) device includes: a gate line, a gate electrode and a gate pad electrode on a substrate; a data line crossing the gate line, source and drain electrodes over the gate electrode, and a data pad electrode at an end of the data line; a gate insulating layer and a semiconductor layer under the data line, the source and drain electrodes, and the data pad electrode; a passivation layer on an entire surface of the substrate including a channel region of the semiconductor layer, except the data line, the source and drain electrodes, the gate pad electrode and the data pad electrode; and a pixel electrode electrically connected to the drain electrode.

In another aspect of the present invention, a method for fabricating a liquid crystal display (LCD) device includes: forming a gate line, a gate electrode, and a gate pad electrode on a substrate; sequentially forming a gate insulating layer, a semiconductor layer and a metal layer on an entire surface of the substrate including the gate electrode; forming a first photoresist on the metal layer; patterning the semiconductor layer, a data line, source and drain electrodes, and a data pad electrode by selectively etching the gate insulating layer, the semiconductor layer, and the metal layer using the first photoresist as a mask; forming a second photoresist to cover the gate pad electrode; forming a passivation layer on an entire surface of the substrate including the first and second photoresists; removing the passivation layer on the first and second photoresists by lift-stripping the first and second photoresists; and forming a pixel electrode electrically connected to the drain electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, an LCD device and a method for fabricating the same according to the present invention will be explained.

First Embodiment

Figure 2:
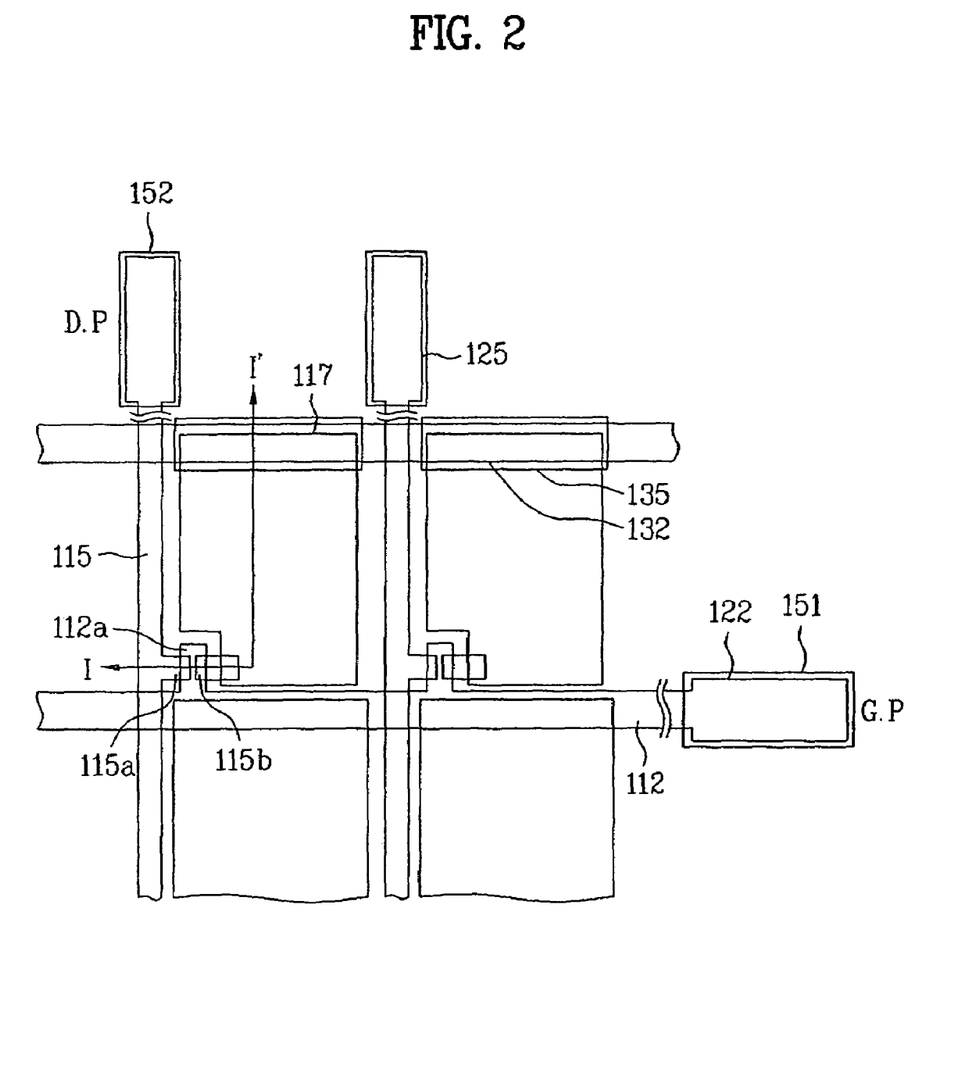
FIG. 2 is a plan view illustrating a TFT array substrate of an LCD device according to the first embodiment of the present invention.
Figure 3:
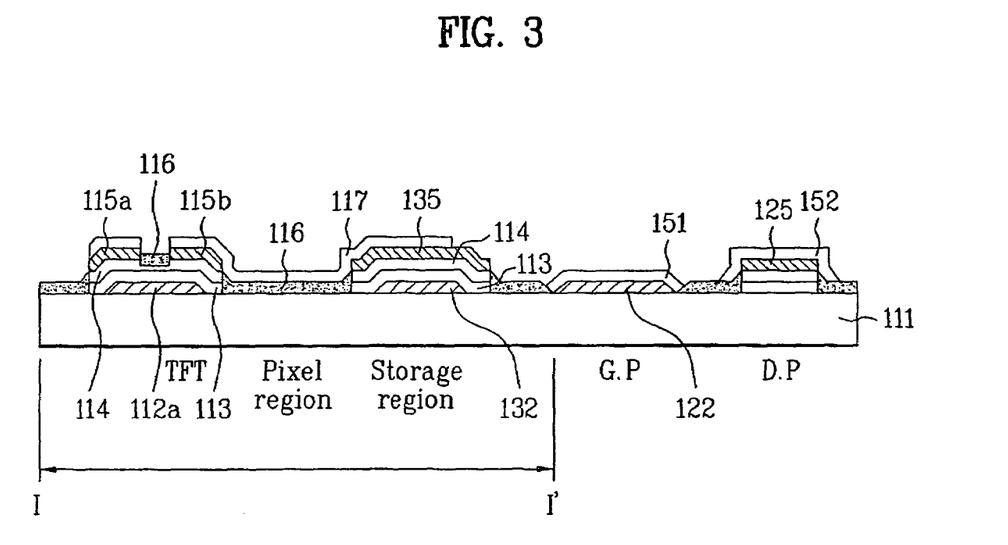
FIG. 3 is a cross-sectional view illustrating a TFT array substrate of an LCD device according to the first embodiment of the present invention.

FIG. 2 is a plan view illustrating a TFT array substrate of an LCD device according to the first embodiment of the present invention. FIG. 3 is a cross-sectional view illustrating a TFT array substrate of an LCD device according to the first embodiment of the present invention. FIGS. 4A to 4H are cross-sectional views illustrating a method for fabricating a TFT array substrate of an LCD device according to the first embodiment of the present invention.

Referring to FIGS. 2 and 3, the TFT array substrate according to the first embodiment of the present invention includes an active area for a pixel electrode 117 and a thin film transistor (TFT), a gate pad area (G.P) for a gate pad electrode 122 and a data pad area (D.P) for a data pad electrode 125.

The active area includes a gate line 112, a data line 115, the thin film transistor (TFT), the pixel electrode 117, and lower and upper capacitor electrodes 132 and 135. The gate line 112 is formed substantially perpendicular to the data line 115 to define a unit pixel region. The thin film transistor (TFT) is formed adjacent to a crossing of the gate and data lines 112 and 115. The thin film transistor (TFT) is formed by sequentially depositing a gate electrode 112a, a gate insulating layer 113, a semiconductor layer 114, and source and drain electrodes 115a and 115b. The pixel electrode 117 is formed in the unit pixel region and is electrically connected to the drain electrode 115b of the thin film transistor (TFT). The lower and upper capacitor electrodes 132 and 135 are formed in parallel to the gate line 112.

In the active area, the gate insulating layer 113 and the semiconductor layer 114 are formed under the data line 115, the source and drain electrodes 115a and 115b, and the upper capacitor electrode 135. Also, the gate insulating layer 113 and the semiconductor layer 114 are formed in the same shape as the data line 115, the source and drain electrodes 115a and 115b, a channel region of the semiconductor layer 114 and the upper capacitor electrode 135.

A passivation layer 116 is formed in a channel region of the semiconductor layer 114 between the source electrode 115a and the drain electrode 115b. The passivation layer 116 protects the channel region from an external light or a liquid crystal layer. The passivation layer 116 is formed by depositing an inorganic insulating layer of silicon oxide or silicon nitride between the source electrode 115a and the drain electrode 115b, or by coating an organic insulating material including BenzoCycloButene (BCB) or acrylic-based material between the source electrode 115a and the drain electrode 115b. When the passivation layer 116 is formed of an inorganic insulating layer, the passivation layer has beneficially a thickness below 1000 Å. When the passivation layer 116 is formed of an organic insulating layer, the passivation layer has beneficially a thickness below 3000 Å. The passivation layer 116 is formed on the substrate except the areas of the data line 115, the source and drain electrodes 115a and 115b, and the lower and upper capacitor electrodes 132 and 135.

The lower capacitor electrode 132 is formed at the same layer level as the gate line and receives a voltage from a periphery of the active area. The upper capacitor electrode 135 electrically connected to the pixel electrode 117 is formed at the same layer level as the data line and receives a voltage from the pixel electrode 117.

The pad area includes the gate pad electrode 122 that extends from the gate line 112 so as to transmit a scanning signal inputted from the externals, and the data pad electrode 125 that extends from the data line 115 so as to transmit a video signal. The gate pad electrode 122 is covered with a first transparent conductive layer 151, and the data pad electrode 125 is covered with a second transparent conductive layer 152, so that it is possible to prevent the gate and data pad electrodes 122 and 125 from being oxidized.

In the pad area, the gate insulating layer 113 and the semiconductor layer 114 are formed under the data pad electrode 125 and the passivation layer 116 is not formed on the gate pad electrode 122 and the data pad electrode 125.

Although not shown, a color filter array substrate including a common electrode and a color filter layer is provided facing the TFT array substrate described above, and a liquid crystal layer is formed between the TFT array substrate and the color filter array substrate.

Hereinafter, a method for fabricating the TFT array substrate of the LCD device according to the first embodiment of the present invention will be explained.

Figure 4A:
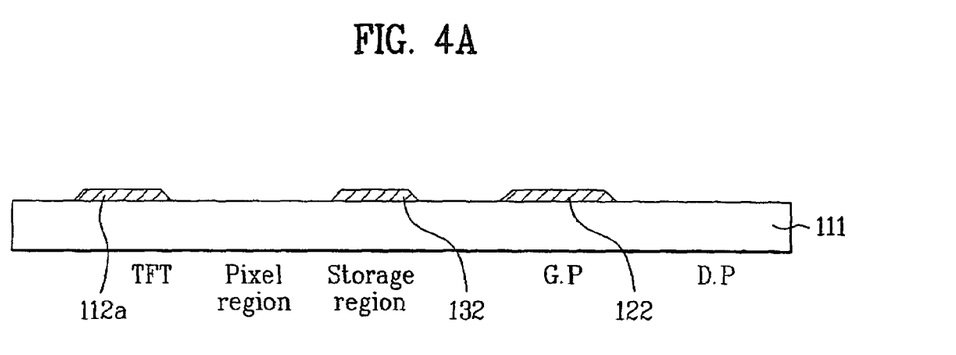
FIGS. 4A to 4H are cross-sectional views illustrating a method for fabricating a TFT array substrate of an LCD device according to the first embodiment of the present invention.

Referring to FIG. 4A, a metal material including copper (Cu), cupper alloy (Cu Alloy), aluminum (Al), aluminum Neodymium (AlNd), molybdenum (Mo), molybdenum alloy (Mo Alloy), chrome (Cr), chrome alloy (Cr Alloy), titanium (Ti), titanium alloy (Ti Alloy), argentum (Ag) or argentum alloy (Ag Alloy), and more beneficially, Mo/AlNd is deposited on the substrate 111 by a sputtering method. Then, the metal material is patterned by a photolithography process using a first exposure mask, thereby forming the gate line 112, the gate electrode 112a at a TFT region, the lower capacitor electrode 132 at a storage region, and the gate pad electrode 122 at the gate pad area (G.P). The lower capacitor electrode 132 is formed in parallel to the gate line 112, the gate electrode 112a is integrally formed with the gate line 112, and the gate pad electrode 122 is integrally formed with an end of the gate line 112.

Figure 4B:
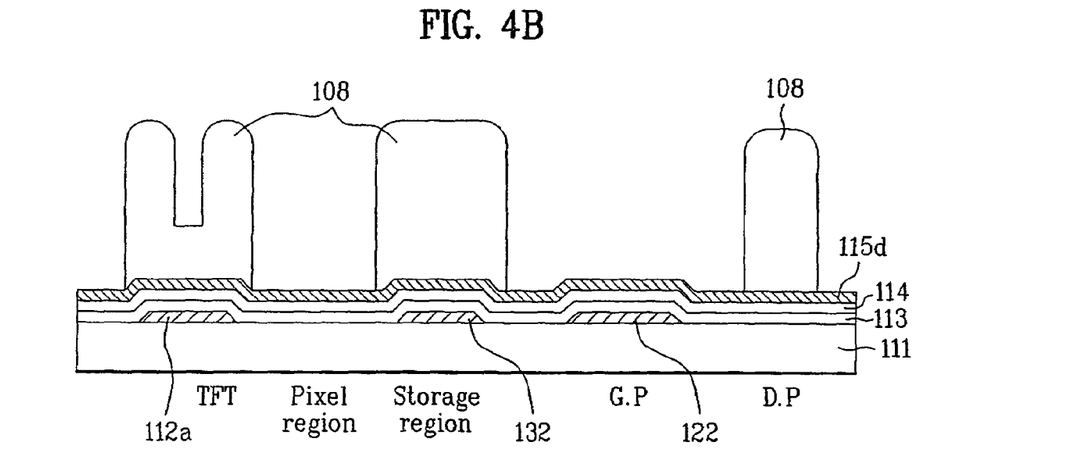

Referring to FIG. 4B, an inorganic insulating material including silicon oxide ($SiO_x$) or silicon nitride ($SiN_x$) is formed on an entire surface of the substrate 111 including the gate electrode 112a at a high temperature, thereby forming the gate insulating layer 113.

Then, an amorphous silicon material for the semiconductor layer 114 is deposited on the gate insulating layer 113 by a CVD (Chemical Vapor Deposition) method. Thereafter, a metal material 115d of copper (Cu), cupper alloy (Cu Alloy), aluminum (Al), aluminum Neodymium (AlNd), molybdenum (Mo), molybdenum alloy (Mo Alloy), chrome (Cr), chrome alloy (Cr Alloy), titanium (Ti), titanium alloy (Ti Alloy), argentum (Ag) or argentum alloy, and more beneficially, Mo is deposited on the amorphous silicon layer by a sputtering method.

Then, a first photoresist 108 of UV curable resin is coated on an entire surface of the metal material 115d by a spinning method or roll coating method. Then, after a second exposure mask (not shown) having a predetermined pattern is aligned with the first photoresist 108, UV or X-ray light is applied to the first photoresist 108, thereby forming a first photoresist pattern having different heights.

The second exposure mask is a diffraction exposure mask that includes a transmission part, a semi-transmission part and a light-shielding part. The transmission part has a light-transmittance ratio of about 100%, the light-shielding part has a light-transmittance ratio of about 0%, and the semi-transmission part has a light-transmittance ratio between about 0% and about 100%.

With the light exposure through the diffraction exposure mask, the first photoresist 108 has three different thicknesses therein. That is, the first photoresist corresponding to the transmission part of the diffraction exposure mask is removed completely, the first photoresist corresponding to the light-shielding part remains, and the first photoresist corresponding to the semi-transmission part is removed at a predetermined thickness. The first photoresist 108 described above is a positive-type photoresist so that the portion of the photoresist exposed to light is removed during a development process. In case of a negative-type photoresist, the portion of the photoresist that is not exposed to light is removed during a development process.

That is, the first photoresist 108 has three different thicknesses therein. For example, the first photoresist 108 corresponding to the data line, the source and drain electrodes and the data pad area (D.P) remains after a development process. Meanwhile, the first photoresist 108 corresponding to a channel layer of the TFT has a predetermined thickness as the first photoresist 108 is partially removed. Then, the remaining portions of the first photoresist 108 are completely removed.

Figure 4C:
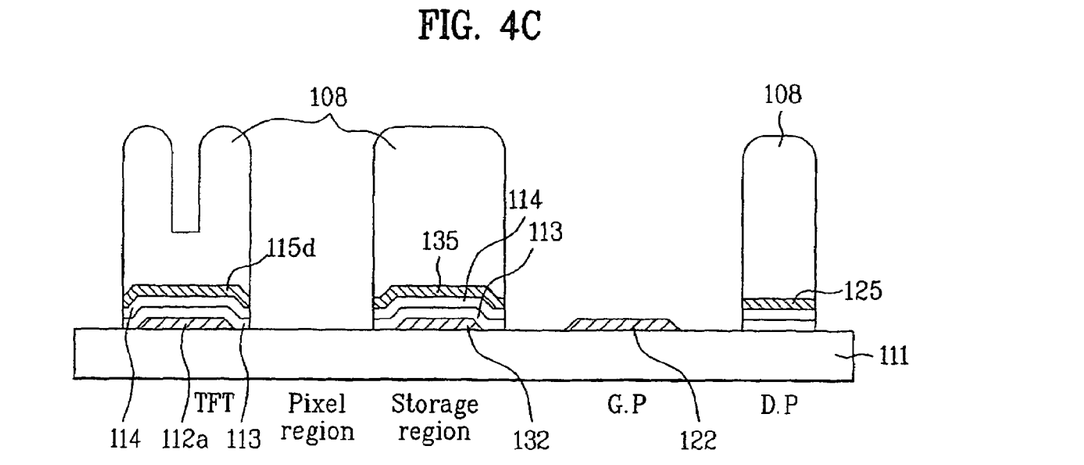

Referring to FIG. 4C, the exposed metal material 115d, amorphous silicon material 114 and gate insulating layer 113 are etched using the first photoresist pattern 108 as a mask, thereby forming the data line 115, the semiconductor layer 114 of the TFT, the upper capacitor electrode 135 at the storage region and the data pad electrode 125 at the data pad area (D.P).

The gate insulating layer 113, the amorphous silicon material 114 and the metal material 115d may be etched together in a one dry-etching chamber. To do this, different etching gases are provided in the etching chamber. For example, an etching gas of $SF_6$, $Cl_2$ or $O_2$ is used to etch the metal material (Mo), an etching gas of $SF_6$, $Cl_2$ or $H_2$ is used to etch the amorphous silicon material, and an etching gas of $SF_6$, $O_2$ or He is used to etch the gate insulating layer. At this time, the gate pad electrode 122 at the gate pad area (G.P) is not dry-etched, because the gate electrode is formed of a metal material that is different from the metal material (Mo) of the data line and can maintain its presence under the dry-etching condition of the metal material (Mo) of the data line. For example, when the gate electrode is formed of either copper or Mo/AlNd, the copper layer or AlNd layer prevents the gate electrode from being etched under the dry-etching condition of the metal material (Mo) of the data line.

Figure 4D:
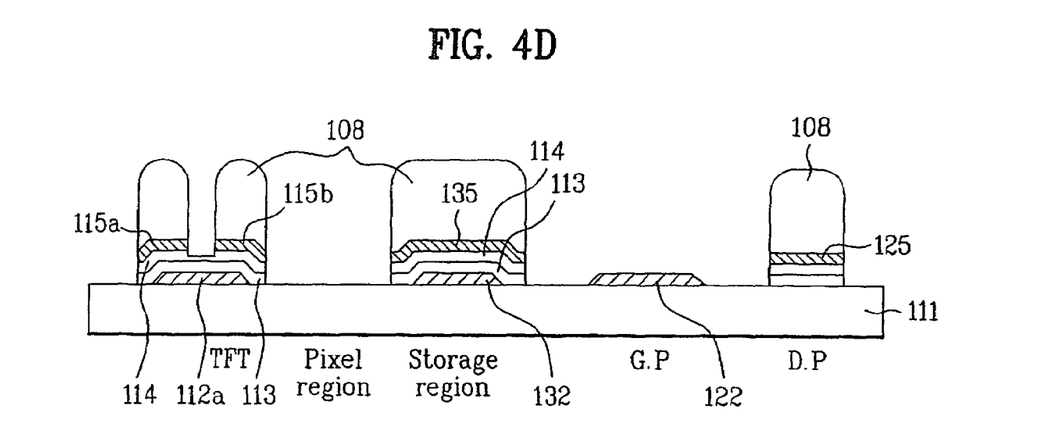

Referring to FIG. 4D, after an ashing process, the first photoresist 108 having the predetermined thickness corresponding to the channel region of the TFT is completely removed and the first photoresist 108 corresponding to the data line, the source and drain electrodes and the data pad area (D.P) still remains with a reduced thickness. Then, the metal material corresponding to the channel region of the TFT is selectively etched, thereby forming the source and drain regions 115a and 115b above the semiconductor layer 114.

Accordingly, it is possible to form the data line, the source and drain electrodes 115a and 115b, the data pad electrode 125, the semiconductor layer 114, and the upper capacitor electrode 135 with a single diffraction exposure mask. At this time, the data line is formed substantially perpendicular to the gate line, thereby defining a sub-pixel. Also, the semiconductor layer 114 and the source and drain electrodes 15a and 15b are sequentially overlapped with the gate electrode 112a, thereby forming the thin film transistor TFT. Also, the gate insulating layer 113 and the semiconductor layer 114 are interposed between the lower and upper capacitor electrodes 132 and 135, and the upper capacitor electrode 135 is overlapped with the lower capacitor electrode 132.

Figure 4E:
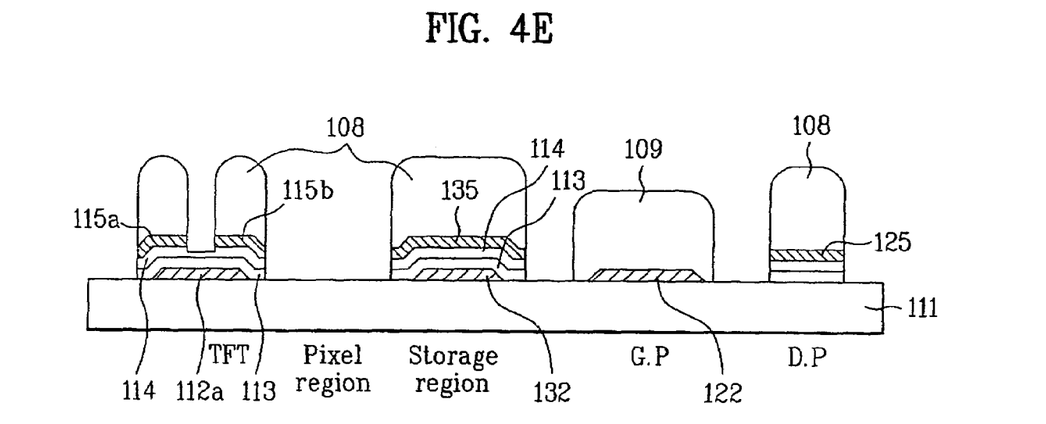
Figure 4F:
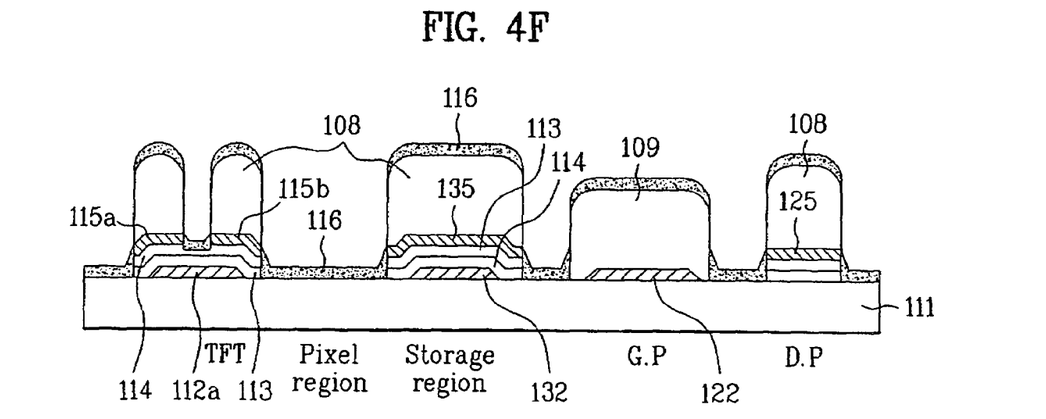

Referring to FIG. 4E, a second photoresist 109 is formed to cover the gate pad electrode 122 using a printing technology. Then, an inorganic insulating material including silicon nitride ($SiN_x$) or silicon oxide ($SiO_x$) is formed on an entire surface of the substrate including the first and second photoresists 108 and 109 with a thickness of 1000 Å or less, thereby forming the passivation layer 116, as illustrated in FIG. 4F.

Because the thickness of the passivation layer 116 is relatively small, the inorganic insulating material is hardly deposited at the sidewalls of the first and second photoresist 108 and 109 that are about ten times thicker than the passivation layer. When the passivation layer 116 is formed at the sidewalls of the first and second photoresists 108 and 109, it is difficult to smoothly perform a lift-strip process that will be discussed below. In such a case, a plasma treatment may be performed on the sidewalls of the photoresist to remove the inorganic insulating material.

The passivation layer 116 may be formed of an organic insulating material including BCB or acrylic resin. In such a case, a coating method that takes advantage of the flow of the organic insulating material between photoresist patterns may be used and a thickness of the passivation layer may be 3000 Å or less.

Figure 4G:
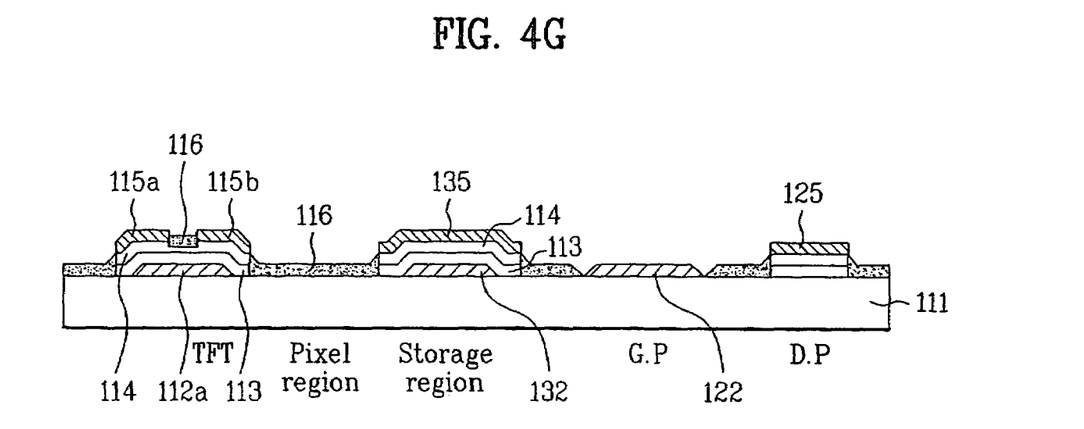

Referring to FIG. 4G, the substrate 111 is then provided with a stripper to lift-strip the first and second photoresists 108 and 109. Accordingly, the passivation layer 116 formed on the upper surface of the first and second photoresists 108 and 109 is removed during the lift-strip process. The stripper may includes NMP, MEA, BOG, carbitol, organic-based chemical compound including an additive, or IPA (Iso-Propyl Alcohol). The stripped photoresist may be removed by an inexpensive solution, for example, acetone.

After the lift-strip process, the source and drain electrodes 115a and 115b, the upper capacitor electrode 135, the gate pad electrode 122 and the data pad electrode 125 are exposed. The passivation layer 116 remains in the channel region between the source electrode 115a and the drain electrode 115b to protect the channel region from an external light or a liquid crystal layer.

Figure 4H:
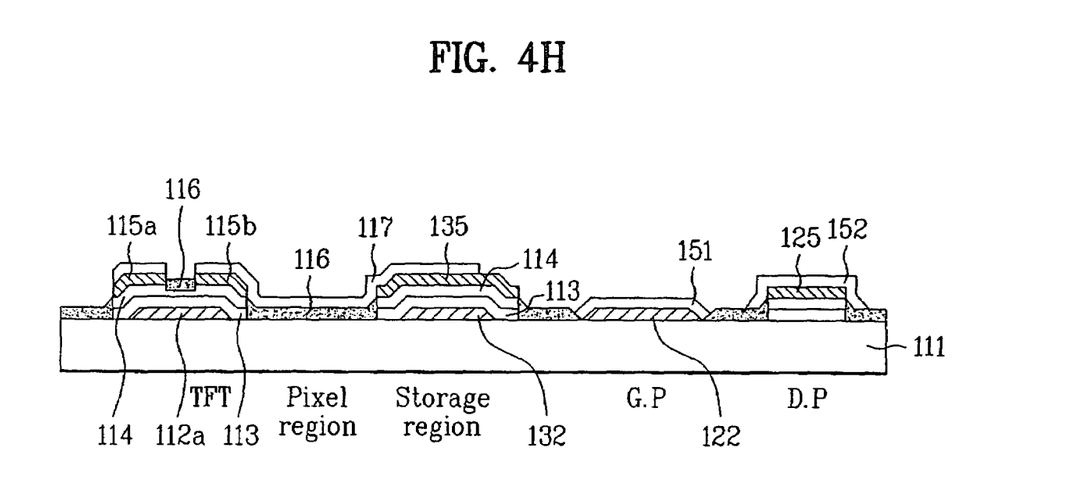

Referring to FIG. 4H, a transparent conductive material such as ITO (Indium Tin Oxide) or IZO (Indium Zinc Oxide) is formed on an entire surface of the substrate 111 including the drain electrode 115d, and is then patterned by a photolithography process using a third exposure mask, thereby forming the pixel electrode 117 and the first and second transparent conductive layers 151 and 152.

The pixel electrode 117 is formed in the pixel area and is electrically connected to the drain electrode 115b, so that a pixel signal inputted from an external driving circuit is applied to the pixel electrode 117. Also, the pixel electrode 117 is electrically connected to the upper capacitor electrode 135 to form a storage capacitor.

The first and second transparent conductive layers 151 and 152 cover the gate pad electrode 122 and the data pad electrode 125, respectively, so as to prevent the gate and data pad electrodes 122 and 125 from being oxidized.

As disclosed above, three exposure masks are used to fabricate the TFT array substrate according to the first embodiment of the present invention.

Although not shown, a color filter array substrate including a common electrode and a color filter layer is attached to the TFT array substrate, and a liquid crystal layer is formed between the TFT array substrate and the color filter array substrate, thereby completing the LCD device according to the present invention. The liquid crystal layer may be formed by a dispensing method. In the dispensing method, the two substrates are attached to each other after liquid crystal is dispensed on any one of the two substrates.

Second Embodiment

The TFT array substrate of the first embodiment relates to a TN mode LCD device. However, the present invention is not limited to the TN mode LCD device. Hereinafter, a TFT array substrate of an IPS mode LCD device according to the second embodiment of the present invention will be explained.

Figure 5:
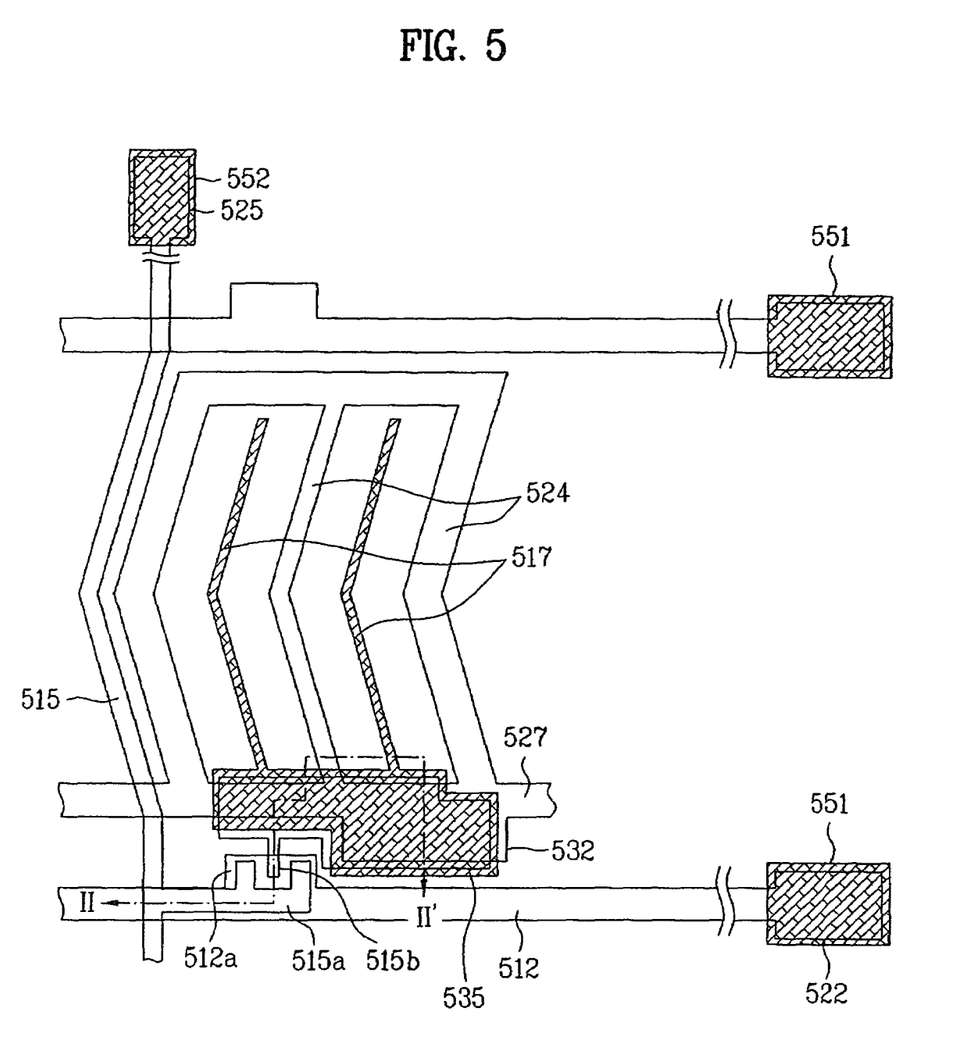
FIG. 5 is a plan view illustrating a TFT array substrate of an LCD device according to the second embodiment of the present invention.
Figure 6:
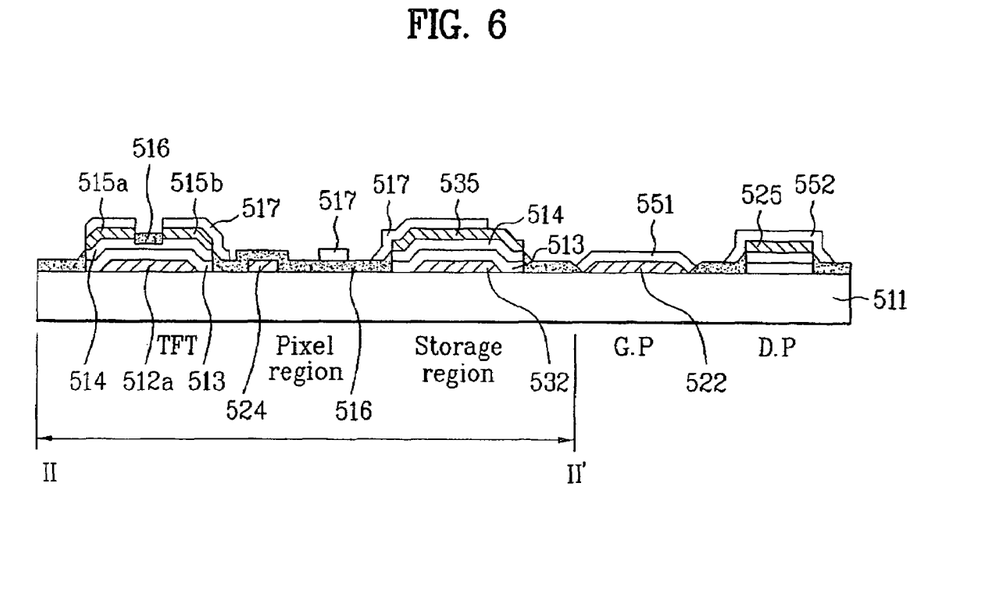
FIG. 6 is a cross-sectional view illustrating a TFT array substrate of an LCD device according to the second embodiment of the present invention.

FIG. 5 is a plan view illustrating a TFT array substrate of an LCD device according to the second embodiment of the present invention. FIG. 6 is a cross-sectional view illustrating a TFT array substrate of an LCD device according to the second embodiment of the present invention. FIGS. 7A to 7H are cross-sectional views illustrating a method for fabricating a TFT array substrate of an LCD device according to the second embodiment of the present invention.

Referring to FIGS. 5 and 6, the TFT array substrate of the IPS mode LCD device according to the second embodiment of the present invention includes an active area for a common electrode 524, a pixel electrode 517 and a thin film transistor (TFT), a gate pad area (G.P) for a gate pad electrode 522, and a data pad area (D.P) for a data pad electrode 525.

The active area includes a gate line 512, a data line 515, a common line 527, the thin film transistor (TFT), the pixel electrode 517, the common electrode 524, and lower and upper capacitor electrodes 532 and 535. The gate line 512 is formed substantially perpendicular to the data line 515 to define a unit pixel region. The common line 527 is formed in parallel to the gate line 512 and transmits a Vcom signal.

The thin film transistor (TFT) is formed adjacent to a crossing of the gate and data lines 512 and 515. The thin film transistor (TFT) is formed by sequentially depositing a gate electrode 512a, a gate insulating layer 513, a semiconductor layer 514, and source and drain electrodes 515a and 515b. The pixel electrode 517 is electrically connected to the drain electrode 515b of the thin film transistor (TFT). The common electrode 524 is extended from the common line 527 and is formed in parallel to the pixel electrode 517, thereby generating a transverse electric field parallel to the substrate. The lower and upper capacitor electrodes 532 and 535 form a storage capacitor.

In the active area, the gate insulating layer 513 and the semiconductor layer 514 are formed under the data line 515, the source and drain electrodes 515a and 515b, and the upper capacitor electrode 535. Also, the gate insulating layer 513 and the semiconductor layer 514 are formed in the same shape as the data line 515, the source and drain electrodes 515a and 515b, a channel region of the semiconductor layer 514 and the upper capacitor electrode 535.

A passivation layer 516 is formed in a channel region of the semiconductor layer 514 between the source electrode 515a and the drain electrode 515b. The passivation layer 516 protects the channel region from an external light or a liquid crystal layer. The passivation layer 516 is formed by depositing an inorganic insulating layer of silicon oxide or silicon nitride between the source electrode 515a and the drain electrode 515b, or by coating an organic insulating material including BenzoCycloButene (BCB) or acrylic-based material between the source electrode 515a and the drain electrode 515b. When the passivation layer 516 is formed of an inorganic insulating layer, the passivation layer has beneficially a thickness below 1000 Å. When the passivation layer 516 is formed of an organic insulating layer, the passivation layer has beneficially a thickness below 3000 Å. The passivation layer 516 is formed on the substrate except the data line 515, the source and drain electrodes 515a and 515b, and the lower and upper capacitor electrodes 532 and 535.

The lower capacitor electrode 532 is formed at the same layer level as the gate line 512 and is integrally formed with the common line 527. The upper capacitor electrode 535 is formed at the same layer level as the data line 515. When the upper capacitor electrode 535 is formed with an island pattern, the upper capacitor electrode 535 is electrically connected to the pixel electrode 517 to receive a voltage from the pixel electrode 517. The upper capacitor electrode 535 may be integrally formed with the drain electrode 515b.

The pad area includes the gate pad electrode 522 which extends from the gate line 512 so as to transmit a scanning signal inputted from the external, and the data pad electrode 525 which extends from the data line 515 so as to transmit a video signal. The gate pad electrode 522 is covered with a first transparent conductive layer 551, and the data pad electrode 525 is covered with a second transparent conductive layer 552, so that it is possible to prevent the gate and data pad electrodes 522 and 525 from being oxidized. The first and second transparent conductive layers 551 and 552 are formed at the same layer level as the pixel electrode 517 of the active area.

In the pad area, the gate insulating layer 513 and the semiconductor layer 514 are formed under the data pad electrode 525 and the passivation layer 516 is not formed on the gate pad electrode 522 and the data pad electrode 525.

Although not shown, a color filter array substrate including a color filter layer is provided facing the TFT array substrate described above, and a liquid crystal layer is formed between the TFT array substrate and the color filter array substrate.

Hereinafter, a method for fabricating the TFT array substrate of the IPS mode LCD device according to the second embodiment of the present invention will be explained.

Figure 7A:
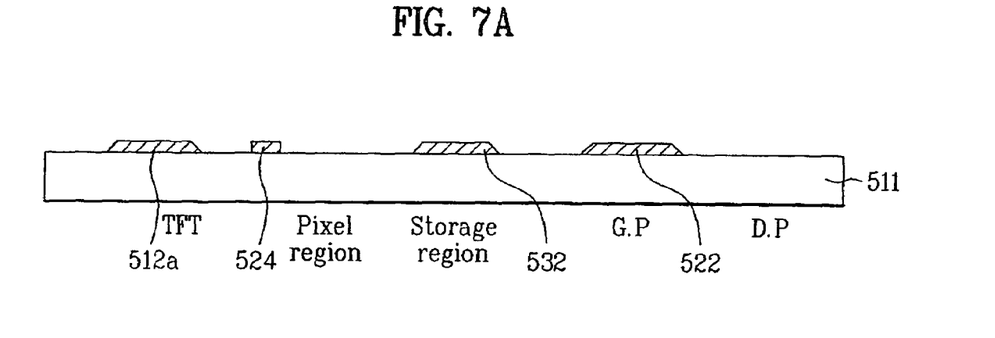
FIGS. 7A to 7H are cross-sectional views illustrating a method for fabricating a TFT array substrate of an LCD device according to the second embodiment of the present invention.

Referring to FIG. 7A, a metal material including copper (Cu), cupper alloy (Cu Alloy), aluminum (Al), aluminum Neodymium (AlNd), molybdenum (Mo), molybdenum alloy (Mo Alloy), chrome (Cr), chrome alloy (Cr Alloy), titanium (Ti), titanium alloy (Ti Alloy), argentum (Ag) or argentum alloy (Ag Alloy), and more beneficially, Mo/AlNd is deposited on the substrate 511 by a sputtering method. Then, the metal material is patterned by a photolithography process using a first exposure mask, thereby forming the gate line 512, the gate electrode 512a of the TFT region, the common line 527 formed in parallel to the gate line 512, the plurality of common electrodes 524 formed in parallel and extended from the common line 527, and the gate pad electrode 522 of the gate pad area (G.P). At this time, a predetermined portion of the common line functions as the lower capacitor electrode 532 of the storage capacitor.

Figure 7B:
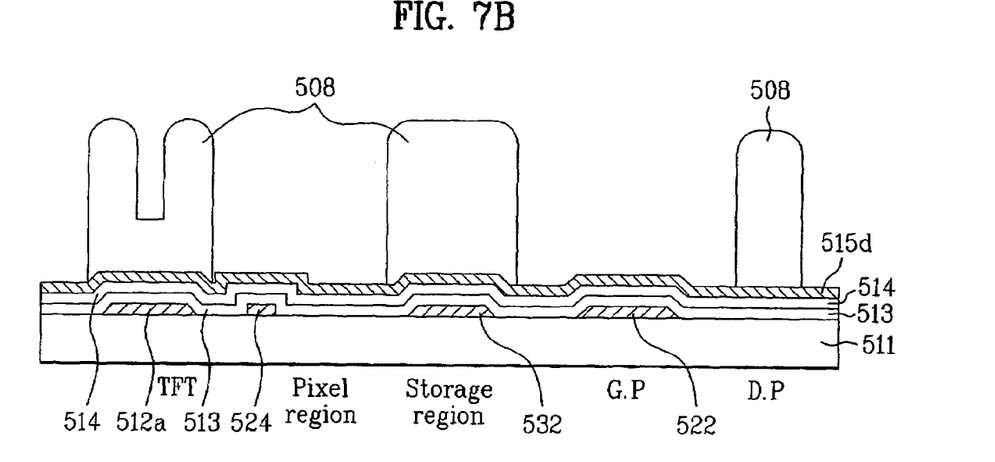

Referring to FIG. 7B, an inorganic insulating material including silicon oxide ($SiO_x$) or silicon nitride ($SiN_x$) is formed on an entire surface of the substrate 511 including the gate electrode 512a at a high temperature, thereby forming the gate insulating layer 513.

Then, an amorphous silicon material for the semiconductor layer 514 is deposited on the gate insulating layer 513 by a CVD (Chemical Vapor Deposition) method. Thereafter, a metal material 515d of copper (Cu), cupper alloy (Cu Alloy), aluminum (Al), aluminum Neodymium (AlNd), molybdenum (Mo), molybdenum alloy (Mo Alloy), chrome (Cr), chrome alloy (Cr Alloy), titanium (Ti), titanium alloy (Ti Alloy), argentum (Ag) or argentum alloy, and more beneficially, Mo is deposited on the amorphous silicon layer by a sputtering method.

Then, a first photoresist 508 of UV curable resin is coated on an entire surface of the metal material 515d by a spinning method or roll coating method. Then, after a second exposure mask (not shown) having a predetermined pattern is aligned with the first photoresist 508, UV or X-ray light is applied to the first photoresist 508, thereby forming a first photoresist pattern having different heights.

The second exposure mask is a diffraction exposure mask that includes a transmission part, a semi-transmission part and a light-shielding part. The transmission part has a light-transmittance ratio of about 100%, the light-shielding part has a light-transmittance ratio of about 0%, and the semi-transmission part has a light-transmittance ratio between about 0% and about 100%.

That is, the first photoresist 508 has three different thicknesses therein. For example, the first photoresist 508 corresponding to the data line, the source and drain electrodes and the data pad area (D.P) remains after a development process. Meanwhile, the first photoresist 508 corresponding to a channel layer of the TFT has a predetermined thickness as the first photoresist 508 is partially removed. Then, the remaining portions of the first photoresist 508 is completely removed.

Figure 7C:
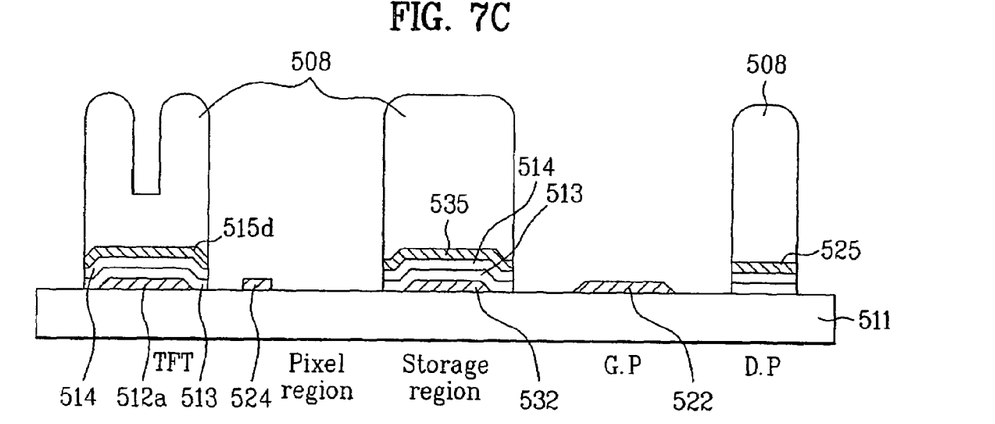

Referring to FIG. 7C, the exposed metal material 515d, amorphous silicon material 514 and gate insulating layer 513 are etched using the first photoresist pattern 508 as a mask, thereby forming the data line 515, the semiconductor layer 514 of the TFT, the upper capacitor electrode 535 at the storage region, and the data pad electrode 525 at the data pad area (D.P).

The gate insulating layer 513, the amorphous silicon material 514 and the metal material 515d may be etched together in a one dry-etching chamber. To do this, different etching gases are provided in the etching chamber. For example, an etching gas of $SF_6$, $Cl_2$ or $O_2$ is used to etch the metal material (Mo), an etching gas of $SF_6$, $Cl_2$ or $H_2$ is used to etch the amorphous silicon material, and an etching gas of $SF_6$, $O_2$ or He is used to etch the gate insulating layer. At this time, the gate pad electrode 522 of the gate pad area (G.P) is not dry-etched because the gate electrode is formed of a metal material that is different from the metal material (Mo) of the data line and can maintain its presence under the dry-etching condition of the metal material (Mo) of the data line. For example, when the gate electrode is formed of either copper or Mo/AlNd, the copper layer or AlNd layer prevents the gate electrode from being etched under the dry-etching condition of the metal material (Mo) of the data line.

Figure 7D:
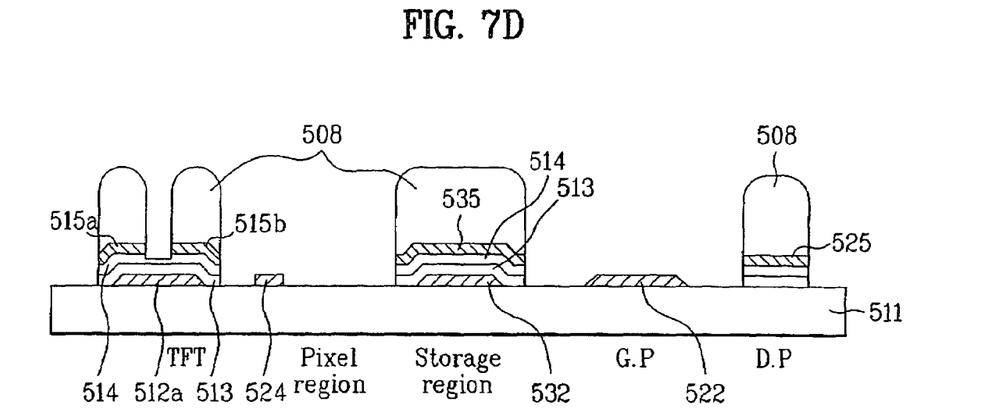

Referring to FIG. 7D, after an ashing process, the first photoresist 508 having the predetermined thickness corresponding to the channel region of the TFT is completely removed, and the first photoresist 508 corresponding to the data line, the source and drain electrodes and the data pad area (D.P) still remains with a reduced thickness. Then, the metal material corresponding to the channel region of the TFT is selectively etched, thereby forming the source and drain regions 515a and 515b above the semiconductor layer 514.

Accordingly, it is possible to form the data line, the source and drain electrodes 515a and 515b, the data pad electrode 525, the semiconductor layer 514, and the upper capacitor electrode 535 with a single diffraction exposure mask. At this time, the data line is formed substantially perpendicular to the gate line, thereby defining a sub-pixel. Also, the semiconductor layer 514 and the source and drain electrodes 515a and 515b are sequentially overlapped with the gate electrode 512a, thereby forming the thin film transistor TFT. Also, the gate insulating layer 513 and the semiconductor layer 514 are interposed between the lower and upper capacitor electrodes 532 and 535, and the upper capacitor electrode 535 is overlapped with the lower capacitor electrode 532, thereby forming the storage capacitor.

Figure 7E:
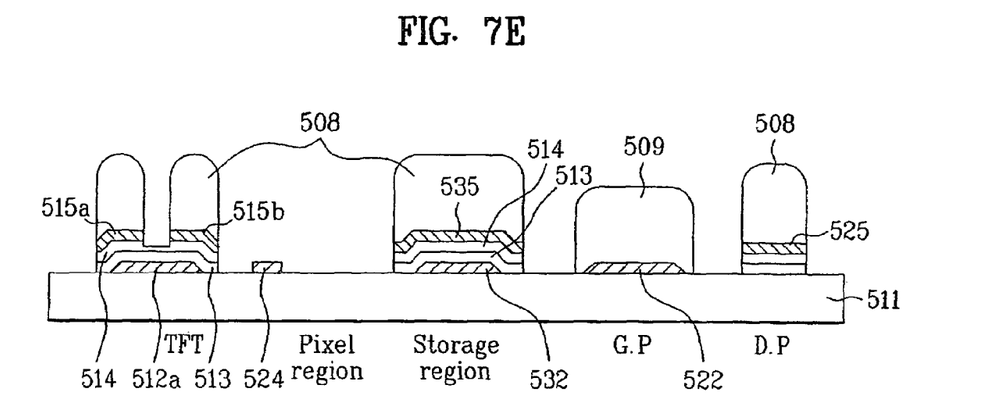
Figure 7F:
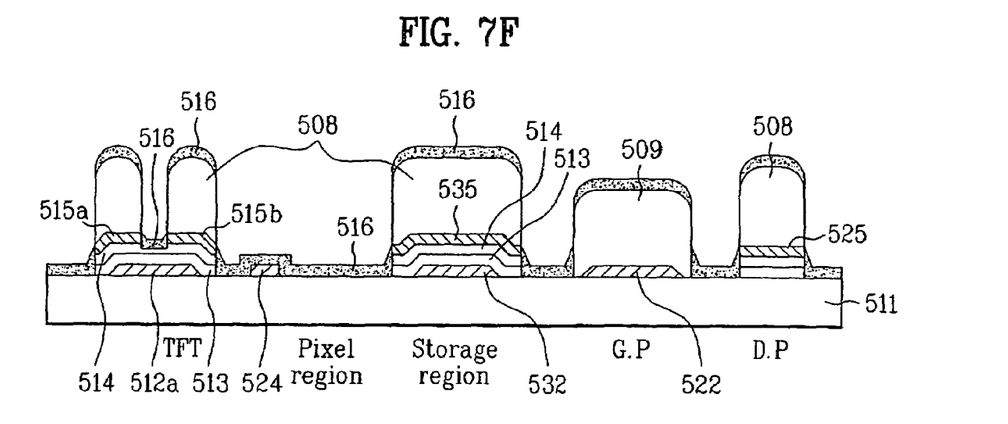

Referring to FIG. 7E, a second photoresist 509 is formed to cover the gate pad electrode 522 using a printing technology. Then, an inorganic insulating material including silicon nitride ($SiN_x$) or silicon oxide ($SiO_x$) is formed on an entire surface of the substrate including the first and second photoresists 508 and 509 with a thickness of 1000 Å or less, thereby forming the passivation layer 516, as illustrated in FIG. 7F. The passivation layer 516 may be formed of an organic insulating material including BCB or acrylic resin. When the passivation layer is formed of an organic insulating material, a thickness of the passivation layer may be 3000 Å or less.

Because the thickness of the passivation layer 516 is relatively small, the inorganic insulating material is hardly deposited at the sidewalls of the first and second photoresist 508 and 509 that are about ten times thicker than the passivation layer. When the passivation layer 516 is formed at the sidewalls of the first and second photoresists 508 and 509, it is difficult to smoothly perform a lift-strip process that will be discussed below. In such a case, a plasma treatment may be performed on the sidewalls of the photoresist to remove the inorganic insulating material.

Figure 7G:
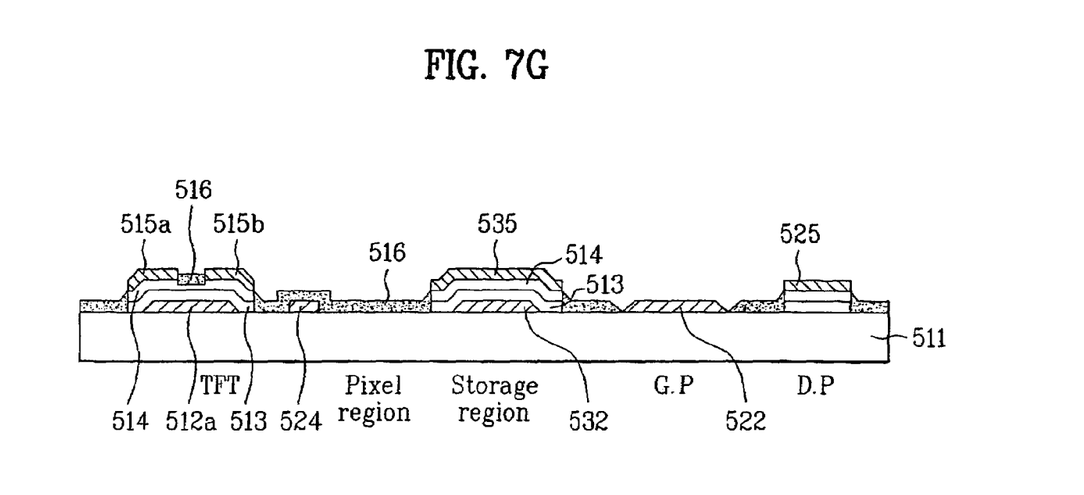

Referring to FIG. 7G, the substrate 511 is then provided with a stripper to lift-strip the first and second photoresists 508 and 509. Accordingly, the passivation layer 516 formed on the upper surface of the first and second photoresists 508 and 509 is removed during the lift-strip process.

After the lift-strip process, the source and drain electrodes 515a and 515b, the upper capacitor electrode 535, the gate pad electrode 522 and the data pad electrode 525 are exposed. The passivation layer 516 remains in the channel region between the source electrode 515a and the drain electrode 515b to protect the channel region from an external light or a liquid crystal layer.

Figure 7H:
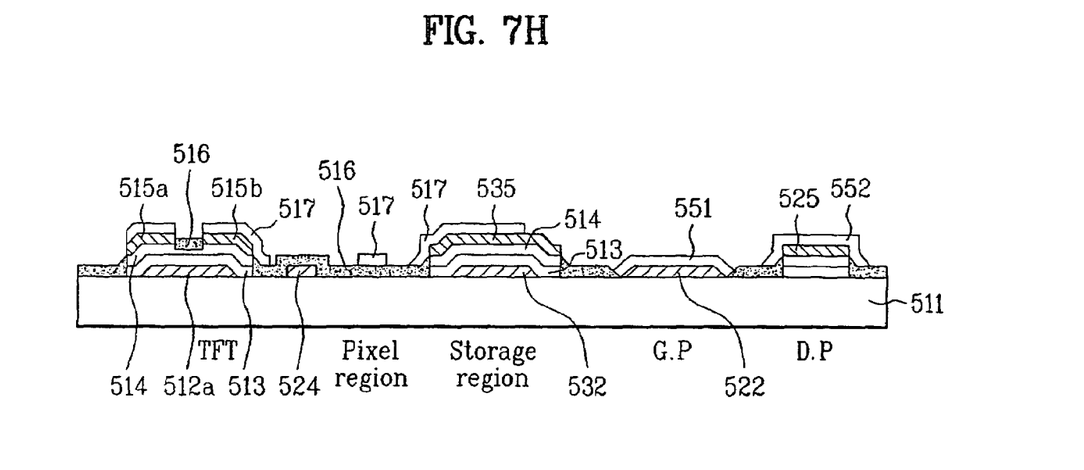

Referring to FIG. 7H, a transparent conductive material such as ITO (Indium Tin Oxide) or IZO (Indium Zinc Oxide) is formed on an entire surface of the substrate 511 including the drain electrode 515d, and is then patterned by a photolithography process using a third exposure mask, thereby forming the pixel electrode 517 and the first and second transparent conductive layers 551 and 552.

The pixel electrode 517 is electrically connected to the drain electrode 515b and is formed in parallel to the common electrode 524 in the unit pixel region, thereby generating a transverse electric field when a voltage is applied to the LCD device. Also, the pixel electrode 517 is electrically connected to the upper capacitor electrode 535 to form a storage capacitor.

The first and second transparent conductive layers 551 and 552 cover the gate pad electrode 522 and the data pad electrode 525, respectively, so as to prevent the gate and data pad electrodes 522 and 525 from being oxidized.

As disclosed above, three exposure masks are used to fabricate the TFT array substrate of the IPS mode LCD device according to the second embodiment of the present invention.

Accordingly, an LCD device and method for fabricating the same according to the present invention has the following advantages. After forming the gate line, the gate insulating layer, the semiconductor layer and the metal layer are sequentially deposited and patterned together with a diffraction exposure mask, so that it is possible to form the data line pattern and the semiconductor layer pattern at the same time, thereby reducing the number of masks. With the reduced number of masks, it is possible to decrease the fabrication time and costs. The principles of the present invention can be applicable to various modes of LCD devices including the TN and IPS modes.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display (LCD) device, comprising:
   forming a gate line, a gate electrode, and a gate pad electrode on a substrate;
   sequentially forming a gate insulating layer, a semiconductor layer and a metal layer on an entire surface of the substrate including the gate electrode;
   forming a first photoresist on the metal layer;
   patterning the semiconductor layer, a data line, source and drain electrodes, and a data pad electrode by selectively etching the gate insulating layer, the semiconductor layer, and the metal layer using the first photoresist as a mask;
   forming a second photoresist to cover the gate pad electrode;
   forming a passivation layer on an entire surface of the substrate including the first and second photoresists;
   removing the passivation layer on the first and second photoresists by lift-stripping the first and second photoresists; and
   forming a pixel electrode electrically connected to the drain electrode,
   wherein the patterning the semiconductor layer, the data line, the source and drain electrodes, and the data pad electrode by selectively etching the gate insulating layer, the semiconductor layer, and the metal layer using the first photoresist as a mask includes;
   forming the semiconductor layer, the data line, and the data pad electrode by etching together the gate insulating layer, the semiconductor layer, and the metal layer using the first photoresist as a mask;
   ashing the first photoresist; and
   forming the source and drain electrodes by patterning the metal layer above the semiconductor layer using the ashed first photoresist as a mask.

2. The method of claim 1, wherein the first photoresist is patterned using a diffraction exposure mask.

3. The method of claim 1, wherein the first photoresist is patterned to have at least two different heights.

4. The method of claim 1, wherein the etching together the gate insulating layer, the semiconductor layer, and the metal layer is performed in a one dry-etching chamber.

5. The method of claim 1, further comprising:
   performing a plasma treatment to remove the passivation layer from sidewalls of the first and second photoresists, after forming a passivation layer on an entire surface of the substrate including the first and second photoresists.

6. The method of claim 1, wherein the passivation layer is formed of an inorganic insulating material layer having a thickness of 1000 Å or less, or is formed of an organic insulating material layer having a thickness of 3000 Å or less.

7. The method of claim 1, wherein the removing the passivation layer on the first and second photoresists by lift-stripping the first and second photoresists leaves the passivation layer on an entire surface of the substrate except the data line, the source and drain electrodes, the gate pad electrode and the data pad electrode.

8. The method of claim 1, further comprising:
forming a transparent conductive layer to cover the gate pad electrode and the data pad electrode.

9. The method of claim 8, wherein the transparent conductive layer is formed at the same time as the pixel electrode.

10. The method of claim 1, further comprising:
forming a lower capacitor electrode when forming the gate line.

11. The method of claim 10, further comprising:
forming an upper capacitor electrode over the lower capacitor electrode when forming the data line by etching the gate insulating layer, the semiconductor layer and the metal layer.

12. The method of claim 11, wherein the pixel electrode is in contact with the upper capacitor electrode.

13. The method of claim 11, wherein said removing the passivation layer on the first and second photoresists by lift-stripping the first and second photoresists leaves the passivation layer on an entire surface of the substrate except the lower and upper capacitor electrodes, the data line, the source and drain electrodes, the gate pad electrode, and the data pad electrode.

14. The method of claim 1, further comprising:
forming a common electrode in parallel to the pixel electrode.

15. The method of claim 14, wherein the common electrode and the gate line are formed at the same time.

16. The method of claim 1, further comprising:
preparing an opposing substrate; and
forming a liquid crystal layer between the two substrates.

17. The method of claim 16, wherein said forming the liquid crystal layer comprises:
dispensing liquid crystal on any one of the two substrates; and
bonding the two substrates together.

* * * * *